(12) United States Patent
Bingham

(10) Patent No.: US 9,630,426 B2
(45) Date of Patent: Apr. 25, 2017

(54) SLIDE LABEL

(71) Applicant: Eastern Business Forms, Inc., Maudlin, SC (US)

(72) Inventor: Lester C Bingham, Dade City, FL (US)

(73) Assignee: Eastern Business Forms, Inc., Maudin, SC (US)

( * ) Notice: Subject to any disclaimer, the term of this patent is extended or adjusted under 35 U.S.C. 154(b) by 0 days.

(21) Appl. No.: 14/877,386

(22) Filed: Oct. 7, 2015

(65) Prior Publication Data
US 2016/0027347 A1 Jan. 28, 2016

Related U.S. Application Data

(62) Division of application No. 13/461,842, filed on May 2, 2012, now abandoned.

(Continued)

(51) Int. Cl.
*G09F 3/02* (2006.01)
*B32B 7/12* (2006.01)
(Continued)

(52) U.S. Cl.
CPC ........... *B41J 3/407* (2013.01); *B32B 3/02* (2013.01); *B32B 7/06* (2013.01); *B32B 7/12* (2013.01); *B32B 27/08* (2013.01); *B32B 27/32* (2013.01); *B32B 27/34* (2013.01); *B32B 27/36* (2013.01); *B32B 2255/24* (2013.01);
(Continued)

(58) Field of Classification Search
CPC ..... G09F 3/02; G09F 3/10; B32B 7/12; B32B 7/06; B32B 27/08; B32B 27/32; B32B 27/36; B32B 27/34; B32B 3/02; B32B 2519/00; B32B 2307/75; B32B 2255/24; B32B 2255/26; B32B 2270/00; B32B 2307/406; B41J 3/407; Y10T 428/14
See application file for complete search history.

(56) References Cited

U.S. PATENT DOCUMENTS

| | | | | |
|---|---|---|---|---|
| 5,273,798 A | * | 12/1993 | Miner | .................. H05K 1/0266 283/81 |
| 2003/0031598 A1 | * | 2/2003 | Stevens | .................. B01L 3/5453 422/549 |

(Continued)

OTHER PUBLICATIONS

3M United Kingdom PLC; Label Material 7816; Web site print outs from http://www.kryxkft.hu/3m/cimke/arlistaban/c7816.pdf; visited May 1, 2012; 5 pages from website; publisher is 3M United Kingdom PLC; pp. 1-5; city is Bracknell, Berkshire, United Kingdom; copyright 2000; copyright 3M United Kingdom PLCes 1-2; (5 pages).

*Primary Examiner* — Patricia L Nordmeyer
(74) *Attorney, Agent, or Firm* — Metz Lewis Brodman Must O'Keefe LLC

(57) ABSTRACT

A label for use with a slide is provided that has a face stock that carries adhesive and an image that is uncovered. The adhesive, the face stock and the image may be capable of withstanding a temperature of 300 degrees Fahrenheit applied thereto for 24 hours, and may be capable of withstanding a temperature of −40 degrees Fahrenheit applied thereto for 10 days such that the adhesive still functions and the image is still readable. A method of using a label for the processing of a specimen is also provided.

25 Claims, 8 Drawing Sheets

Related U.S. Application Data

(60) Provisional application No. 61/484,357, filed on May 10, 2011.

(51) Int. Cl.
 *B41J 3/407* (2006.01)
 *G09F 3/10* (2006.01)
 *B32B 7/06* (2006.01)
 *B32B 27/08* (2006.01)
 *B32B 27/32* (2006.01)
 *B32B 27/34* (2006.01)
 *B32B 27/36* (2006.01)
 *B32B 3/02* (2006.01)

(52) U.S. Cl.
 CPC ....... *B32B 2255/26* (2013.01); *B32B 2270/00* (2013.01); *B32B 2307/406* (2013.01); *B32B 2307/75* (2013.01); *B32B 2519/00* (2013.01)

(56) References Cited

U.S. PATENT DOCUMENTS

| | | | |
|---|---|---|---|
| 2006/0105120 A1* | 5/2006 | Keeton | B41M 5/38207 428/32.39 |
| 2007/0166501 A1* | 7/2007 | Seitz | B32B 7/10 428/41.8 |

* cited by examiner

SLIDE LABEL

CROSS-REFERENCE TO RELATED APPLICATIONS

This application is a divisional application and claims the benefit of U.S. patent application Ser. No. 13/461,842 filed on May 2, 2012 and entitled "Slide Label and Slide Label Testing Environment" whose contents are incorporated by reference herein in their entirety for all purposes, which claims priority and benefit to U.S. Provisional Patent Application No. 61/484,357 filed on May 10, 2011 titled "unique label design that eliminates the need for a flap when used in automated slide preparation instruments." U.S. Provisional Patent Application No. 61/484,357 is incorporated by reference herein in its entirety for all purposes.

FIELD OF THE INVENTION

The present invention relates generally to a label for application to slides that include a specimen that is tested. More particularly, the present application involves a label that lacks a cover slip such that an image on the label is uncovered and does not degrade when the specimen on the slide is subjected to harsh processing that may include stainers, reagents, antibodies and high temperatures.

BACKGROUND

Tissue samples and other biological matter are often processed so that a physician may determine the presence of disease elements or to glean other information from the material. For example, a hematoxylin and eosin (H&E) stain is known for application to tissue samples to determine if cancer may be present. More advanced testing and processing, such as immunohistochemistry (IHC), may utilize reagents to isolate proteins and stainers to stain the proteins and may also include a reconstituting step. The testing of specimens may involve the use of harsh stainers, reagents, antibodies and temperatures in order for the necessary information to be obtained from the specimen. Preparation of specimens is often accomplished by way of one or more automated instruments.

Specimens are located on a slide when they are prepared by the automated instruments. The slide also includes a label that provides information such as identification of the specimen, identification of the lab or entity performing the test, dates, and may include a bar code that can be read by the automated instrument in order to instruct the automated instrument as to what protocols to run on the specimen. Although the label itself is not being tested, it is often the case that the label is subjected to the harsh stainers, reagents, antiboides and temperatures that are used in the testing process since the label is located on the slide right next to the specimen. Although some stainers, reagents, antibodies and/or temperatures to which the label is subjected are not strong enough to degrade the labels and cause their image to be unreadable or cause them to detach from the slide, other types of stainers, reagents and/or temperatures applied in other processing will in fact cause the label to degrade so that it detaches from the slide or so that the image on the label cannot be read.

In order to protect labels used in harsh environments such as those that employ harsh stainers, reagents, antibodies and/or temperatures, it is known to provide a label that has a protective covering. The label is located on a liner and desired information is printed onto a printable area of the label. The label includes a clear flap with adhesive on its bottom surface with its own clear flap liner. Once the desired information is printed on the printable area of the label, the user peels the clear flap liner off and bends the clear flap down on top of the image on the printable area of the label. The adhesive on the bottom surface of the clear flap engages the image and the printable area of the label in order to adhere the clear flap to the pintable area of the label. The user may then peel the label with the image and the attached clear flap from the liner and apply this label to the slide. The clear flap will protect the label and the printed image from being distorted during testing of the specimen. The image and face stock of the label are made of material and configured in such a manner that they will degrade or detach when subjected to harsh stainers, reagents, antibodies and/or temperatures during testing, and the clear flap protects the image and other portions of the label during testing.

Although capable of protecting the label during testing, the clear flap cannot be written on by the user. It is sometimes the case that the user desires to write in process notes on the label with the use of a pen, pencil, marker or other writing instrument. The clear flap is made of a material onto which the markings of a writing instrument will not stick thus making it impossible for the user to apply desired notes to the label. Additionally, once the specimen is tested it is placed into an automatic cover slipping device that automatically applies a cover slip on top of the specimen. The adhesive on the clear flap often will ooze (adhesive flow) and get inside of the automated cover slipper and prevent or hinder the cover slip from being applied. Further, adhesive ooze from the clear flap may jamb the automated cover slipper and prevent it from working and require expensive and time consuming repair. Additionally, when information is printed onto the printable area of the label, the adjacent clear flap may move upwards on the liner and hinder or jamb the printer that is printing the information onto the printable area. This is because the top surface of the clear flap faces the liner before it is folded into engagement with the printable area and there is no adhesive on the top surface of the clear flap to retain same onto the liner. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
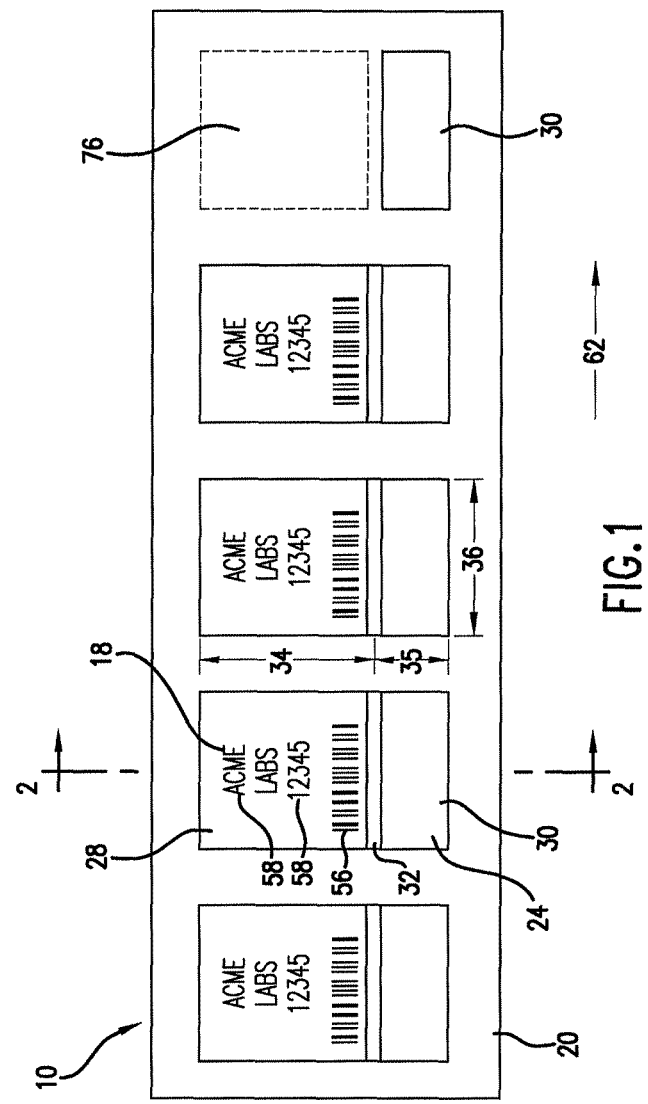
FIG. 1 is a top view of a plurality of labels on a liner with one of the main sections of one of the labels removed.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a label 10 that can be used with a slide 12 to identify the specimen 42 carried by the slide 12 and to identify testing procedures that are to be or were performed on the specimen 42. The label 10 includes a main section 28 onto which an image 18 that has the various information can be placed. The main section 28 can be peeled from a liner 20 and applied to the slide 12 while a secondary section 30 of the label 10 remains on the liner 20 and is not applied to the slide 12. The image 18 on the main section 28 may be uncovered such that a film, covering sheet, or other item is not located on top of the image 18. The slide 12 having the main section 28 with the uncovered image 18 can be placed inside of an automatic processing device that applies stainer 48, reagents 44, antibodies and/or extreme temperatures 46 to the slide 12 in order to test the specimen 42. The main section 28 and image 18 may be subjected to the stainer 48, reagents 44, and/or extreme temperatures 46 during testing. The main section 28 and image 18 are made of robust materials and are arranged in a manner that allows them to withstand the harsh testing environment so that the main section 28 remains attached to the slide 12 and so that the image 18 remains readable. In some arrangements, the liner 20 and silicone release agent 22 may be part of the label 10 and in other arrangements elements 20 and 22 may not be considered to be a part of the label 10.

Figure 2:
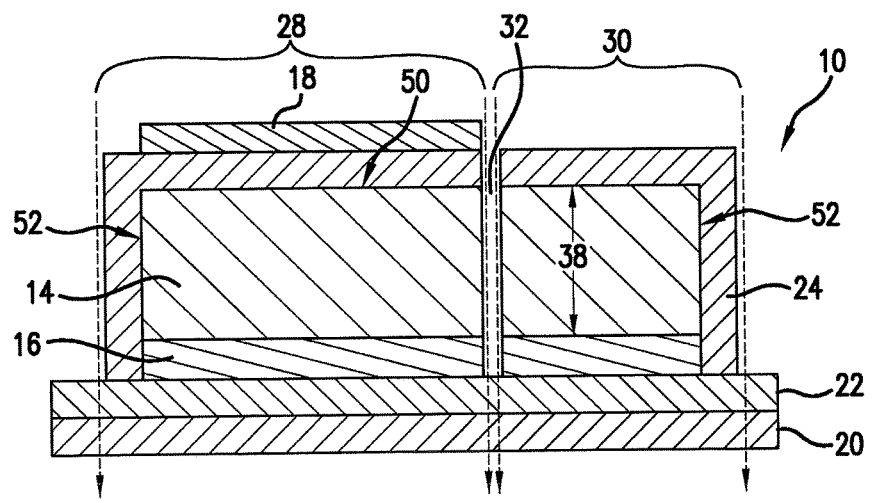
FIG. 2 is a cross-sectional view taken along line 2-2 of FIG. 1.

With reference now to FIGS. 1 and 2, a label 10 in accordance with one exemplary embodiment is disclosed. The label 10 may include a hard calendered liner 20 onto which a layer of silicone release agent 22 is applied. Face stock 14 of the label 10 may be attached to the liner 20 and silicone release agent 22 through the use of an adhesive 16. In this regard, the adhesive 16 engages the silicone release agent 22 and these two components remain attached until such time a user peels the face stock 14 so as to separate the adhesive 16 from the silicone release agent 22. This removal is smooth in that the adhesive 16 will easily disengage from the silicone release agent 22 and will be still retained on the bottom surface of the face stock 14 to aid in subsequent application and adherence of the face stock 14 to the slide 12.

An over varnish 24 may be applied to the face stock 14 so as to cover the top surface 50 and four side surfaces 52 of the face stock 14. If the face stock 14 were made in a shape other than rectangular the over varnish 24 could be applied so as to cover any number of sides 52 or top 50 surfaces of the face stock 14. The over varnish 24 is not applied to and does not engage the bottom surface of the face stock 14 as the bottom surface is coated with adhesive 16. The face stock 14, adhesive 16 and over varnish 24 are divided up into a main section 28 and a secondary section 30. The liner 20 and silicone release agent 22 may also be part of both the main section 28 and the secondary section 30. The main section 28 may have a larger surface area than the secondary section 30. In this regard, the upper surface area of the face stock 14 in the main section 28 may be larger in magnitude than the upper surface area of the face stock in the secondary section 30. In other arrangements, the main section 28 and the secondary section 30 are the same in size, and in yet other arrangements the main section 28 is smaller than the secondary section 30 in surface area. An image 18 is applied to and is carried by the main section 28. The image 18 can be placed on the over varnish 24 so as to cover some of or all of the over varnish 24 that is located on top of the face stock 14 in the main section 28. The image 18 is not located in the secondary section 30 and thus the image 18 is not located on top of any of the over varnish 24 that is located in the secondary section 30.

A slit 32 may be present in order to separate the main section 28 from the secondary section 30. The slit 32 extend through the over varnish 24, face stock 14, and adhesive 16, but may not extend into the silicone release agent 22 or liner 20. The slit 32 may be a complete opening so that the over varnish 24, face stock 14, and adhesive 16 of the main section 28 do not engage the over varnish 24, face stock 14, and adhesive 16 of the secondary section 30. In other arrangements, the slit 32 may be perforations or simply a weakened section such that there is in fact contact between components 24, 14, and 16 of the two sections 28 and 30. The slit 32 may be formed via a knife cutting down into the face stock 14 to the liner 20 in some arrangements, or may be formed by way of die cutting the label 10 onto the liner 20 in other exemplary embodiments.

The label 10 may be arranged so that the face stock 14 of the main section 28 has a length 34 of 0.875 inches, and so that the face stock 14 of the secondary section 30 has a length 35 of 0.59375 inches. In other arrangements the lengths 34 and 35 previously described may include the addition of the length of the layer of over varnish 24 present in the main section 28 and the secondary section 30. The face stock 14 may have a width 36 of 0.9375 inches at both the main section 28 and the secondary section 30. In other arrangements, the width of the layer of over varnish 24 can be included in the width 36 of 0.9375 inches previously described. The face stock 14 may have a thickness 38 of 0.00865 inches in both the main section 28 and the secondary section 30. The various face stock 14, adhesive 16, over varnish 24 and images 18 on the liner 20 may be separated from one another a distance of 0.09375 inches. It is to be understood that the disclosed lengths, 34 and 35, width 36, thickness 38, and separation distances are only exemplary and that others are possible in accordance with other exemplary embodiments of the label 10. The thickness 38 of the face stock 14 may be selected so it alone is of a magnitude capable of blocking reagent 44 from blowing off of the slide 12 when an "air vortex" is applied to the reagent 44 during processing. This is known as a damming effect and may be achieved by the thickness 38 of the face stock 14 alone without the necessary thickness of any other components such as a clear flap.

The face stock 14 of label 10 may be rectangular in shape upon looking at the top view in FIG. 1. The entire face stock 14 is attached to the liner 20/silicone release agent 22 via the adhesive 16 as shown in FIG. 2 such that no portion of the face stock 14 is unattached to the liner 20/silicone release agent 22. In this regard, the entire face stock 14 will lay flat and be attached to the liner 20/silicone release agent 22 across the entire bottom surface of the face stock 14 such that in order to lift any portion of the face stock 14 the adhesive 16 must be disengaged from the liner 20 or silicone release agent 22 if present. Further as shown in FIG. 2, the image 18 is the highest portion of the label 10. The image 18 is thus the farthest portion of the label 10 from the liner 20 in the vertical direction. No other portion of the label 10 may higher than the image 18 or be located on top of the image 18 to cover the image 18.

Figure 9:
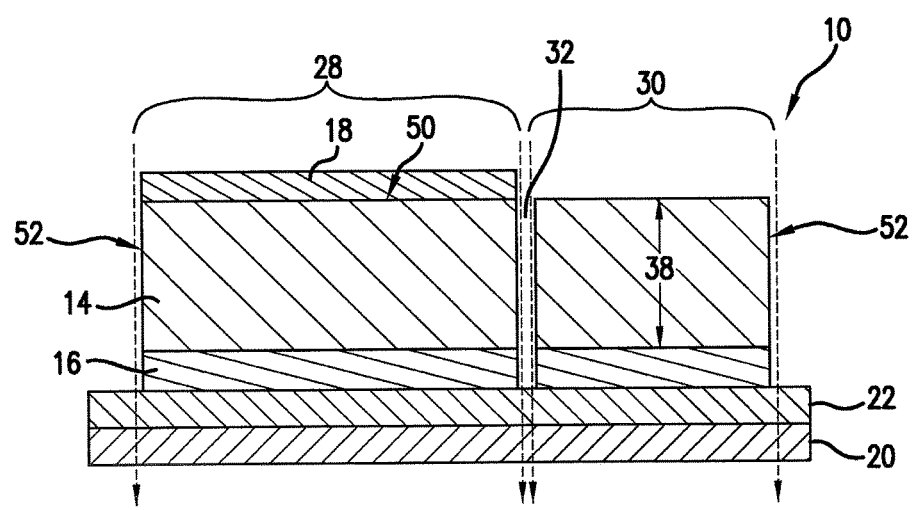
FIG. 9 is a cross-sectional view of a label that lacks an over varnish layer in accordance with another exemplary embodiment.

FIG. 9 discloses an exemplary embodiment in which the over varnish 24 is not present. Here, the image 18 directly contacts the upper surface of the face stock 14, and the sides 52 of the face stock 14 are uncovered. There is no over varnish 24 present in the slit 32. As such, it is to be understood that the over varnish 24 is an optional component and various exemplary embodiments of the label 10 exist in which the over varnish 24 is not present.

Figure 3:
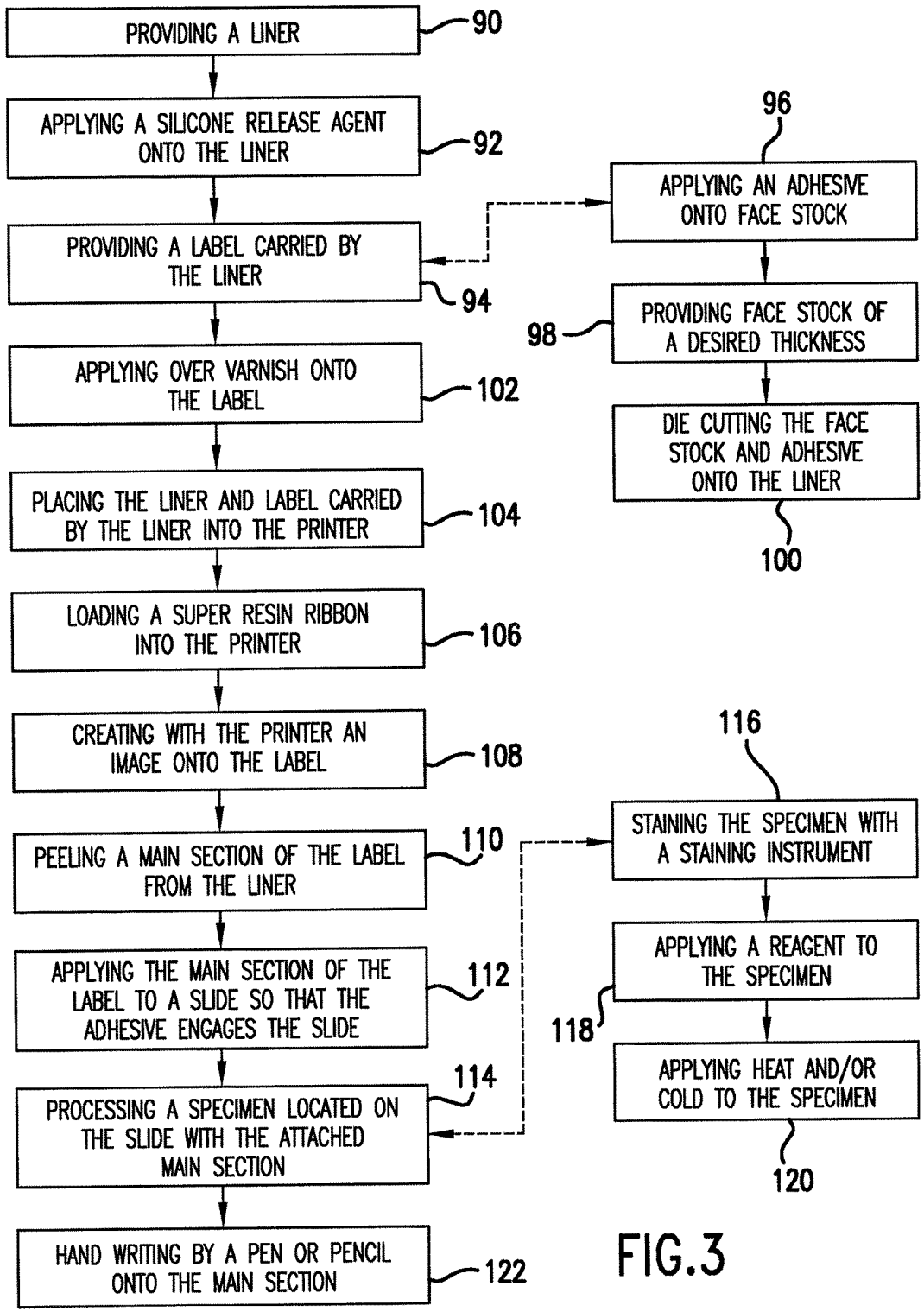
FIG. 3 is flow chart of a method of using a label for the testing of a specimen in accordance with one exemplary embodiment.
Figure 4:
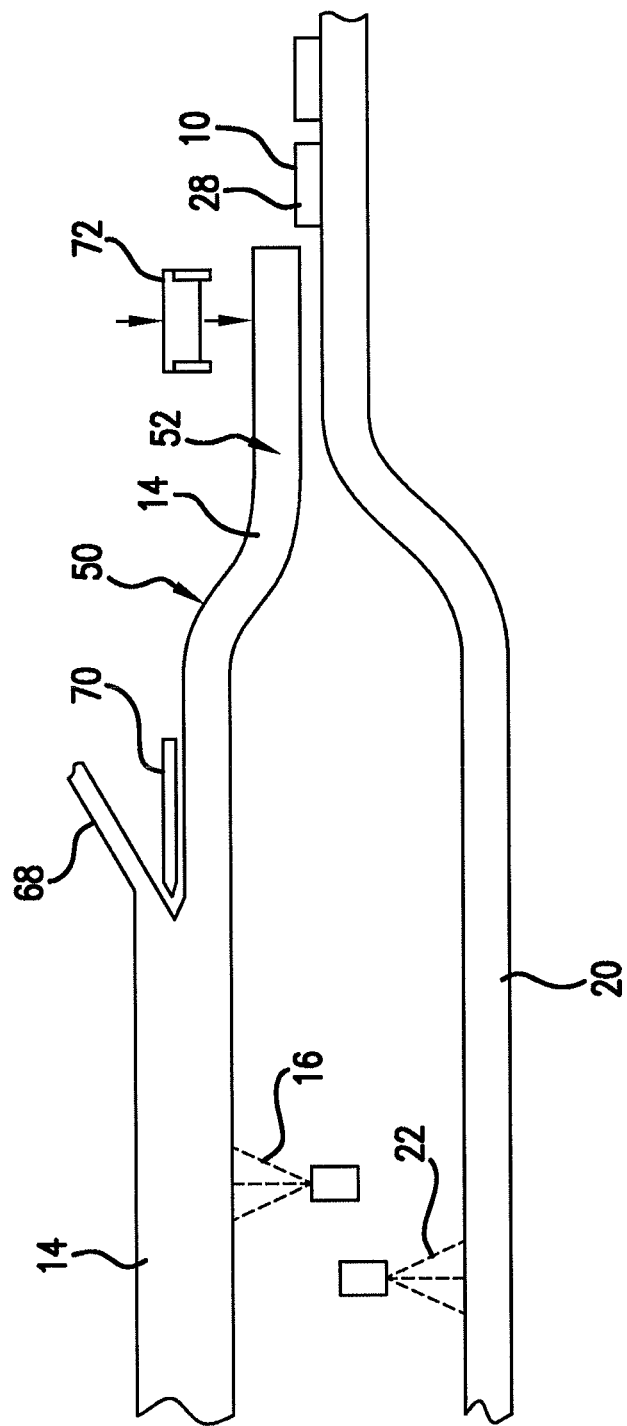
FIG. 4 is a side view of processing of face stock and liner and engagement of these two components together.

FIG. 3 discloses one exemplary embodiment of a method of using a label 10 for the processing of a specimen 42. The method may start out at step 90 in which a liner 20 is provided. The liner 20 may be a special hard calendered liner 20. In certain exemplary embodiments the liner 20 may have a thickness of 81 microns and may be 90 g/m.sup.2 densified kraft. In step 92 a silicone release agent 22 is applied to the upper surface of the liner 20. This application may be seen with reference to FIG. 4 in which the silicone release agent 22 is sprayed onto the upper surface of the liner 20. Next in the method, step 94 is conducted in which a label 10 is provided and is carried by the liner 20. This step 94 may be conducted in a variety of manners. One way of doing this is disclosed in FIG. 3 with reference to steps 96, 98 and 100 although it is to be understood that these three steps 96, 98 and 100 need not be used to accomplish step 94 in other embodiments. H With reference both to FIGS. 3 and 4, step 96 is conducted in which a special adhesive 16 is applied to the bottom surface of the face stock 14. In some arrangements the adhesive 16 is 3M® 310 acrylic adhesive provided by 3M having offices located at 3M Corporate Headquarters, 3M Center, St. Paul, Minn., 55144-1000. However, it is to be understood that the face stock 14, adhesive 16, and/or over varnish 24 can be variously selected in other embodiments so long as they are capable of performing in the environments onto which they may be subjected to stainers 48, reagents 44, antibodies and/or temperature 46 described herein. The adhesive 16 may be a firm adhesive and may resist oozing and may be suitable for adhesion with high surface energy plastics and metals. Although shown as being sprayed onto the face stock 14, the adhesive 16 could be applied in other manners such as through the use of rollers or brushes. The adhesive may have a thickness of 20 micron. The adhesive may be a permanent freezer type in certain arrangements. The adhesive 16 may perform at a 180° peel test procedure that is ASTM D 3330 at an initial 10 minute dwell/RT with stainless steel at 4.7 N/10 mm, polycarbonate at 5.1 N/10 mm, polypropylene at 2.0 N/10 mm, glass at 5.7 N/10 mm, HD polyethylene at 2.6 N/10 mm, and LD polyethylene at 2.2 N/10 mm. The adhesive 16 may perform at a 180° peel test procedure that is ASTM D 3330 conditioned for 3 days at 49° Celsius with stainless steel at 6.6 N/10 mm, polycarbonate at 4.5 N/10 mm, polypropylene at 3.8 N/10 mm, glass at 7.4 N/10 mm, HD polyethylene at 3.3 N/10 mm, and LD polyethylene at 4.0 N/10 mm. The adhesive 16 may perform at a 180° peel test procedure that is ASTM D 3330 conditioned for 24 hours at 32° Celsius at 90% relative humidity with stainless steel at 8.1 N/10 mm, polycarbonate at 6.8 N/10 mm, polypropylene at 4.2 N/10 mm, glass at 7.2 N/10 mm, HD polyethylene at 3.8 N/10 mm, and LD polyethylene at 2.2 N/10 mm.

In step 98 the face stock 14 is provided at a desired thickness. The face stock 14 could be purchased or produced at the desired thickness or could be modified so as to be the desired thickness. As shown, the face stock 14 is calendered to the desired thickness through the use of a calender blade 70 that removes an excess portion 68 of the face stock 14 which may be an upper layer. The excess portion 68 may be discarded or recycled. Although shown as being calendered to the correct thickness, various methods may be used to modify the face stock 14 so that it is of a desired thickness.

Moving on to step 100, the liner 20 and the face stock 14 are brought to a die cutter 72 that die cuts the face stock 14 and adhesive 16 onto the liner 20 so that the label 10 is in effect die cut onto the liner 20. The die cutter 72 may be a rotary die cutter in some arrangements. The die cutter 72 may die cut the face stock 14 and adhesive 16 so that these components are die cut onto the liner 20 in a precisely determined position. The labels 10 may be spaced from one another on the liner 20 as desired and the adhesive 16 on the face stock 14 will cause the face stock 14 to be adhered to the silicone release agent 22 on the liner 20. The die cutter 72 may apply pressure to the face stock 14 to cause the label 10 to be cut onto the liner 20. The die cutter 72 may also cut the slit 32 into the label 10 to form the main section 28 and the secondary section 30 at the same time the label 10 is die cut onto the liner 20. Alternatively, the slit 32 could be subsequently die cut into the label 10 or may be cut with a knife or otherwise formed at some point after formation of the label 10. In yet other embodiments, the main section 28 and secondary section 30 could be formed via separate die cutting processes and arranged next to one another so that the slit 32 is formed not by cutting of the face stock 14 and adhesive 16 but instead by formation of the proximate sections 28 and 30.

Figure 5:
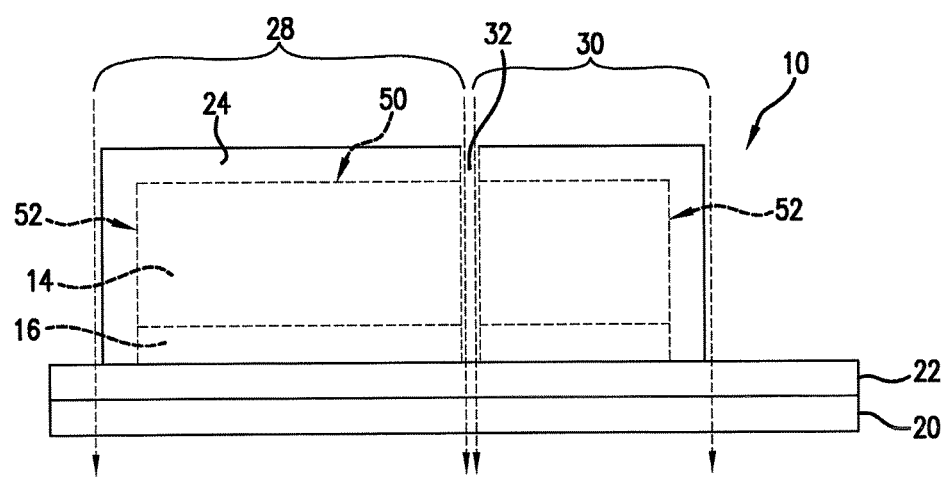
FIG. 5 is a side view of a label in accordance with one exemplary embodiment.

After provision of the label 10 onto the liner 20, the over varnish 24 can be applied to cover the top 50 of the face stock 14 and the four sides 52 of the face stock 14 in step 102. This over varnish layer 24 will thus coat the top 50 and sides 52 of the label 10 all ready applied to the liner 20. FIG. 5 shows the over varnish layer 24 incorporated into the label 10 so that the top 50 and three of the sides 52 of the face stock 14 are covered. The fourth, back side 52 of the face stock 14 is likewise covered although it cannot be seen in FIG. 5. The over varnish 24 contacts the silicone release agent 22. In some arrangements, the over varnish 24 may be located in the slit 32 so that it in effect is between the face stock 14 and/or adhesive 16 that separates the main section 28 from the secondary section 30. In other arrangements, the over varnish 24 is not located in the slit 32. The over varnish 24 may not be a functional part of the separation of the main section 28 and the secondary section 30. The slit 32 may be formed in the label 10 either before or after the application of the over varnish 24.

The face stock 14 in some exemplary embodiments may be 3M® label material 7816 that is thermal transfer polyester label material. The 3M® label material 7816 may include just the face stock 14 or may include both the face stock 14 and the over varnish 24 in accordance with various exemplary embodiments. The face stock 14 may have a thickness 38 of 51 microns and may be made of gloss radiant white polyester. In certain exemplary embodiments the face stock 14 may be a synthetic vinyl. However, in other exemplary embodiments the face stock 14 is not made of a synthetic vinyl. The face stock 14 may be made of polyester, polyolefin, polypropylene, polyamide, polyethylene, or combinations of any of these materials. These various materials may be used either alone to form the face stock 14, or any combination of them may be used together to form the face stock 14. As such, the material making up the face stock 14 may be a single material or may an alloy. The face stock 14 and adhesive 16 may be applied to stainless steel 24 hours prior to immersion at 22° Celsius for four hours and one hour later after removal can be evaluated for peel adhesion at 180° peel angle using testing procedure ASTM D3330 at 305 mm/min with the immersion chemical being isopropyl alcohol having adhesion of 5.9 N/10 mm and edge penetration of 1 mm, engine oil 10W30 of 121° Celsius having adhesion of 7.7 N/10 mm and edge penetration of 1.5 mm, water for 48 hours having adhesion of 7.9 N/10 mm and edge penetration of 0 mm, pH 4 having adhesion of 7.7 N/10 mm, PH10 having adhesion of 7.2 N/10 mm and edge penetration of 0 mm, toluene having adhesion of 3.2 N/10 mm and edge penetration of 6.3 mm, acetone having adhesion of 4.2 N/10 mm and edge penetration of 4.5 mm, brake fluid having adhesion of 8.4 N/10 mm and edge penetration of 0 mm, gasoline having adhesion of 3.5 N/10 mm and edge penetration of 5.5 mm, diesel fuel having adhesion of 6.0 N/10 mm and edge penetration of 1 mm, and hydraulic fluid having adhesion of 6.3 N/10 mm and edge penetration of 0 mm. After all of these various tests, the face stock 14 and adhesive 16 had no change in visual appearance.

In certain exemplary embodiments, the face stock 14 may be selected so as to be capable of being subjected to a temperature of 149° Celsius for 24 hours with no significant visual change, 0.7% machine direction shrinkage, and a 0.8% cross direction shrinkage. The face stock 14 may be selected so as to be capable of being subject to a temperature of −40° Celsius for 3 days with no significant visual change. The face stock may be selected so as to be capable of being subjected for 24 hours at 38° Celsius and 100% relative humidity and display no significant changes in appearance or adhesion.

Figure 6:
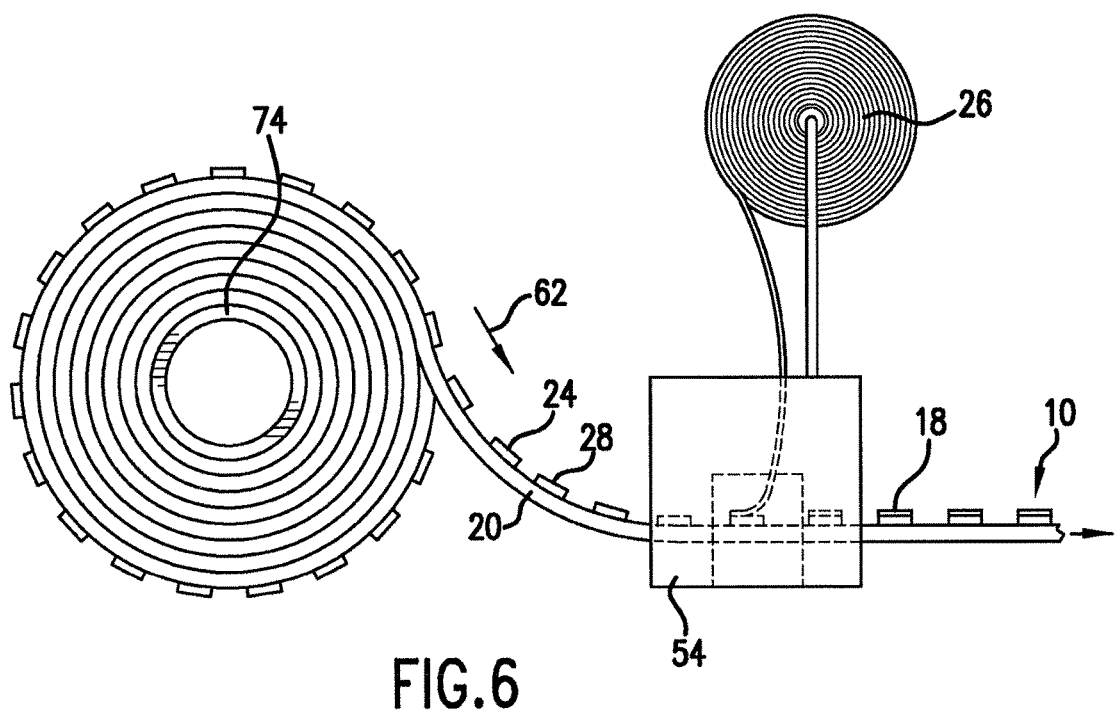
FIG. 6 is a side view of a printer that applies an image onto a roll of labels through a transfer agent that is super resin ribbon.

The method may next move to step 104 in which the labels 10 carried by the liner 20 are placed into a printer 54 or otherwise placed into position to be fed to a printer 54 as shown for example in FIG. 6. The feed direction 62 of the labels 10 and liner 20 is illustrated with reference back to FIG. 1. Here, the labels 10 are fed such that their lengths are forward facing through the printing process. All portions of the labels 10, such as all of the face stock 14 in both the main section 28 and the secondary section 30, remain flat due to adhesive 16 contact during printing. With reference back to FIG. 6, the labels 10 and liner 20 may be wound into a roll that has a core 74. In some embodiments the inner diameter of the core 74 may be one inch, and the outer diameter of the labels 10 and liner 20 may be four inches. The printer 54 may unwind the labels 10 and liner 20 from the core 74. In step 106 a super resin ribbon 26 may be loaded into the printer 54 or otherwise fed into the printer 54. In step 108 an image 18 is created on the label 10 by the printer 54 through use of the super resin ribbon 26. The printer 54 may have enhanced reliability during a feed cycle because a flap or protective over-laminate on the label 10 may not be present to jamb or otherwise disrupt the printing process. The printer 54 may be instructed to print the correct number of labels 10 and provide the desired image 18. The super resin ribbon 26 may be a material that forms the image 18 such that wax is not present in the super resin ribbon 26 and wax is not used to form the image 18. In some embodiments, the super resin ribbon 26 may be 92-BLK-PR243U or 92-BLK-PR443U black super resin ribbon that is supplied by ProAV Connections owned by Wireworks Corporation having offices located at 380 Hillside Avenue, Hillside, N.J., 07205. The image 18 may be a resin that engages the over varnish 24 and/or face stock 14. The super resin ribbon 26 may be suitable for placement of an image 18 onto polyester films, polyethylene films, and polypropylene films in certain exemplary embodiments. The super resin ribbon 26 used may be capable of withstanding and continuing to work upon being subjected to stains 48, reagents 44, and temperatures 46 of the types and degrees mentioned below with respect to the steps 116, 118, and 120 of the process.

With reference back to FIG. 1, a series of labels 20 are shown and images 18 are provided on the main section 28. The image 18 is located on the over varnish 24 that is on the top 50 of the face stock 14. In some embodiments, the image 18 may be located through the over varnish 24 so that the image is in fact in engagement with the top 50 of the face stock 14. The image 18 is not formed on the secondary section 30, although this may be the case in other embodiments. The secondary section 30 is provided for purposes of running the label 10 through the printer 54. In this regard, the printer 54 may be set up to recognize and print labels 10 that have a certain length. This length may be the sum of lengths 34 and 35. If the label 10 only had length 34, the printer 54 may not recognize the presence of the label 10 and it would not be able to print the image 18 onto the label 10. The presence of length 35 may cause the printer 54 to in fact recognize the presence of the label 10 on the liner 20. The secondary section 30 does not hinder the performance of the printer 54 because the secondary section 30 includes adhesive 16 that causes it to be firmly attached to the silicone release agent 22 and retained onto liner 20. The secondary section 30 remains flat on the liner 20 and does not pivot upwards but is instead adhered along its entire bottom surface to the silicone release agent 22 onto liner 20. As such, the secondary section 30 will not fold upwards during the printing process and will not jamb or otherwise hinder the functioning of printer 54.

The image 18 may include a bar code 56 that could be used to key a staining instrument 64 and instruct same or other equipment concerning the correct antibodies and stainers 48 to be applied during processing of the specimen 42. The image 18 may also include identification 58 that is human readable subject matter that may identify the specimen 42, the owner of the specimen 42, the lab that performs the analysis or other desired information. The image 18 may cover the entire top of the main section 28 so that no portion of the top 50 of the face stock 14 or top of the over varnish 24 is present. The image 18 may be uncovered so that nothing is on top of the image 18. In this regard, the super resin ribbon 26 or other material used to make the image 18 may be uncovered. A film, protective sheet, or other item may not be present on top of the super resin ribbon 26 or other material used to make up the image 18.

The next step in the method may be step 110 in which the user may peel the main section 28 from the liner 20 and apply the main section 28 to the slide 12. The user may wear gloves when peeling the main section 28 so as to reduce the chance of contamination being imparted onto the main section 28 and subsequently to the slide 12 and specimen 42. The silicone release agent 22 may allow the main section 28 to be easily peeled from the liner 20. As shown with reference to FIG. 1, one of the labels 10 has been peeled from the liner 20 white the remaining labels 10 remain intact. The user has peeled one of the main sections 28 from the liner 20 to leave an empty space 76. The adjacent secondary section 30 remains attached to the liner 20 since it is not applied to the slide 12 and is only present for use in properly setting or tripping the printer's 54 sensors. As such, the secondary section 30 is present in order for the printer 54 to properly recognize the presence of the label 10 since the printer 54 may be set up to recognize the presence of labels 10 only when they are of the combined lengths 34 plus 35 and may be set up not to recognize the presence of labels 10 when they are of a length less than the combined lengths 34 plus 35.

Figure 7:
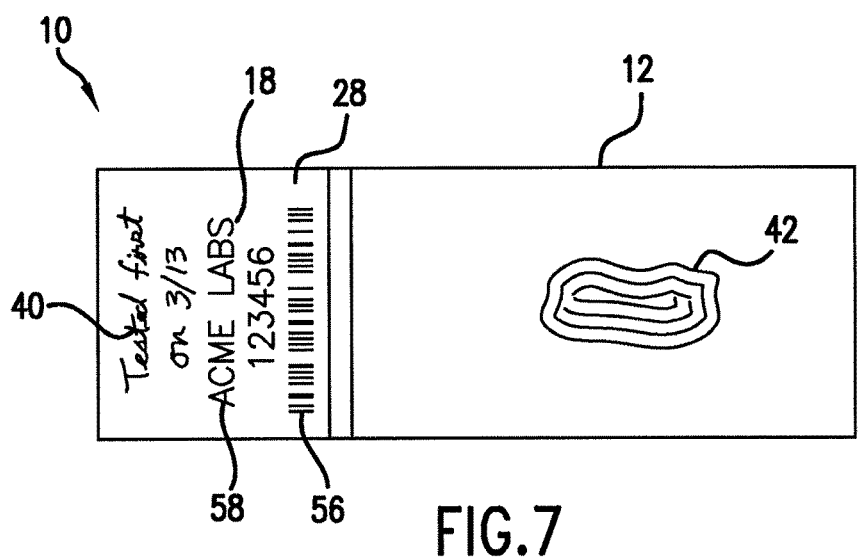
FIG. 7 is a top view of a slide in accordance with one exemplary embodiment.

After the user peels the main section 28 he or she can apply the main section 28 to the slide 12 in step 112. The user will place the adhesive 16 of the main section 28 against the top surface of the slide 12. This arrangement may be seen in FIG. 7 in which the main section 28 is attached to the upper surface of the slide 12. The slide 12 may include a specimen 42 on its upper surface. Although shown as being rectangular in shape, the slide 12 may be variously configured in other exemplary embodiments and may be oval, circular, triangular, or irregular in shape in other versions.

Figure 8:
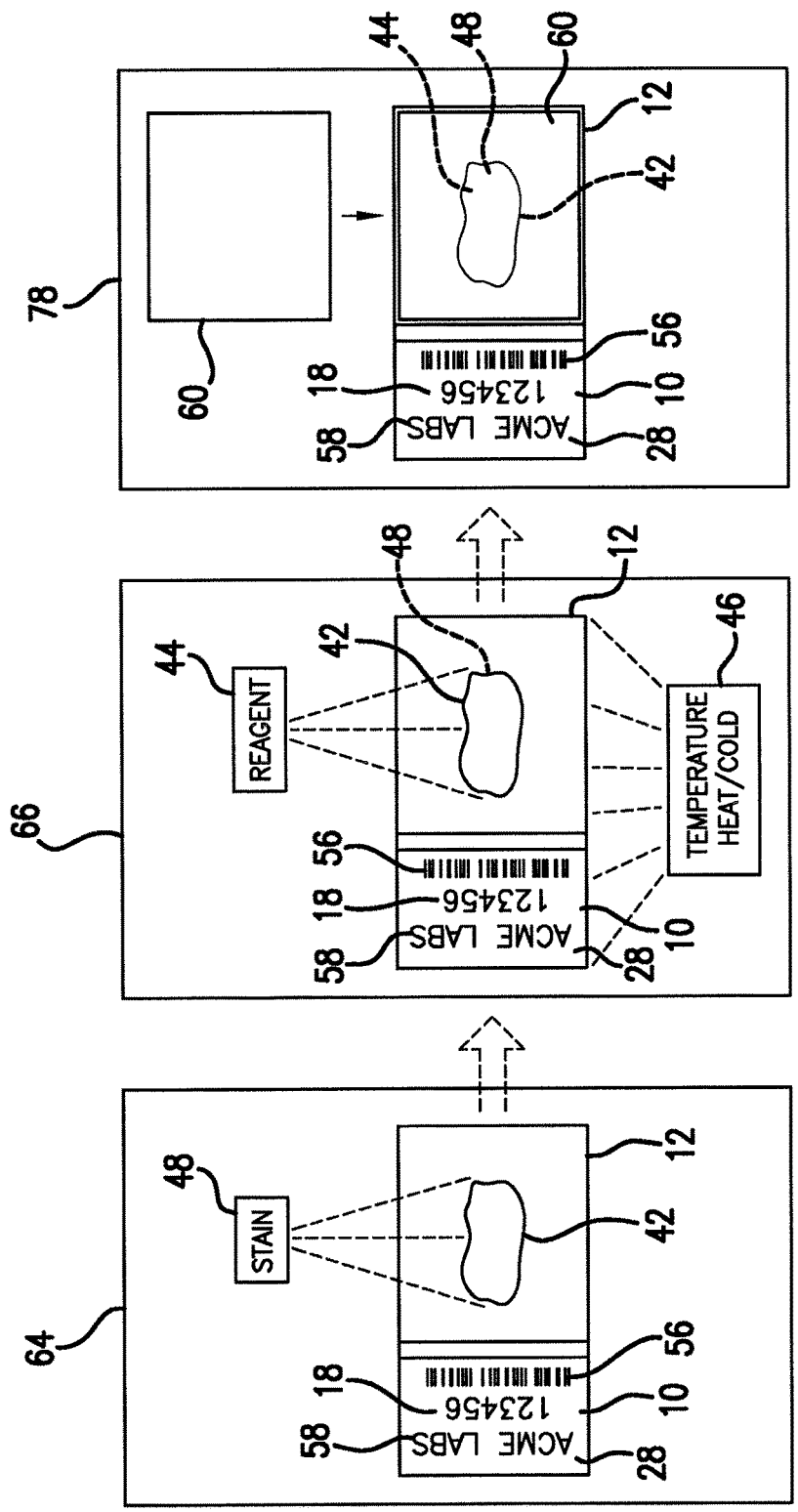
FIG. 8 is a schematic view of various processing instruments that may automatically process a specimen on the slide with attached label.

The method may move onto step 114 in which one or more processing procedures may be performed on the specimen 42 on the slide 12 that has the attached main section 28. One example of a processing procedure conducted on the specimen 42 on the slide 12 is described in steps 116, 118 and 120. However, it is to be understood that steps 116, 118 and 120 are only one example of how the step 114 could be performed and that other steps are possible in other embodiments in order to conduct the processing step 114. In step 116, the specimen 42 is stained with a stainer 48. With reference to FIG. 8, a staining instrument 64 is provided into which the user places the slide 12. The staining instrument 64 may be an automated device that reads the bar code 56 to obtain instructions on which type of stain 48 or stains 48 to apply to the specimen 42. In accordance with certain exemplary embodiments, the stains 48 may be immunohistochemistry (IHC) red, IHC 3,3'-Diaminobenzidine (DAB), messenger ribonucleic acid (mRNA) in situ hybridization (ISH), DNA ISH, fluorescent IHC, and/or DAB/Red Dual Stains or any combination thereof in certain embodiments. It is to be understood that other types of stains 48 may be used in other versions of the staining step 116. Although described as being stained within a staining instrument 64, the stainer 48 may be applied by hand in other embodiments. The face stock 14, adhesive 16, over varnish 24, and image 18 on the slide 12 even if exposed to the stainer 48 still continue to function properly after and during application of the stainer 48.

After staining, the method may move to step 118 in which a reagent 44 is applied to the specimen 42. This application can be done through the use of a processing instrument 66 that may automatically apply the reagent 44 and conduct other protocols on the specimen 42. The reagent 44 may be xylene, acetone, isopropyl alcohol, ethyl alcohol, alkalis, hexane, dimethylformamide, dimethyl sulfoxide, ammonia, 10% neutral buffered formalin (NBF), formic acid, and/or alcoholic formalin or any combination thereof in certain embodiments, or any other reagent that is determined to be needed by the specific protocol. In other exemplary embodiments, the reagent 44 may be hematoxylin and/or various clearing detergents. The face stock 14, adhesive 16, over varnish 24, and image 18 on the slide 12 even if exposed to the reagent 44 still continue to function properly after and during application of the reagent 44. As such, these components are selected and arranged so as to reject the incursion of antibodies, stainers 48 and reagents 44.

The instrument 66 may conduct various processing on the specimen 42 and may read the bar code 56 to determine which protocols are to be conducted. Step 120 calls for the application of heat and/or cold to the specimen 42. The processing instrument 66 may apply a temperature 46 of 300 degrees Fahrenheit to the slide 12 including the label 10 and the specimen 42 for 24 hours such that the adhesive 16 still functions to hold the label 10 (face stock 14, over varnish 24, and image 18) to the slide 12 and such that the image 18 is still readable. In other arrangements the temperature may be 302 degrees Fahrenheit instead of 300 degrees Fahrenheit. The processing instrument 66 may apply other temperatures to the label 10, slide 12 and specimen 42 and these components may still function properly. For example, the processing instrument 66 may apply a temperature of −40 degrees Fahrenheit for 10 days such that the adhesive 16 still functions to hold the label 10 to the slide 12 and the image 18 is still readable. Although described as being capable of withstanding a temperature range that is from −40 degrees Fahrenheit to 300 degrees Fahrenheit, other temperature ranges may be tolerated in other exemplary embodiments. For example, the components of the main section 28 may be capable of withstanding temperatures from −60 degrees Fahrenheit to 320 degrees Fahrenheit, from −70 degrees Fahrenheit to 350 degrees Fahrenheit, up to 250 degrees Fahrenheit, at least 250 degrees Fahrenheit, or up to 400 degrees Fahrenheit in accordance with various exemplary embodiments. The various materials making up the main section 28 such as the face stock 14, adhesive 16, image 18 and over varnish 24 may be selected and arranged in the manner described so as to be capable of working as described herein at all temperatures between and including from −40 degrees Fahrenheit to 302 degrees Fahrenheit.

The testing instrument 66 may be a pathology read station in certain exemplary embodiments. Although shown and described as having a staining instrument 64 and a processing instrument 66, it is to be understood that the staining and reagent application/temperature application/testing may all be performed in a single instrument. Further, although described as being performed by automated equipment, the processing of the specimen 42 may be partially or fully performed using manual techniques. In some exemplary embodiments, the staining instrument 64 and/or processing instrument 66 or any combination of the two may be an Artisan™ Link Pro Special Staining System provided by Dako North America, Inc. having offices located at 6392 Via Real, Carpinteria, Calif. 93013. This device may apply stainer 48, can perform slide 12 drying/baking and deparaffinization. Reagents 44 may also be applied by this device. The device may also perform processing of the specimen 42 or this can be done subsequently. After the device has applied stainer 48, reagent 44, temperature 46 and/or processing of the specimen 42, the slide 12 can be removed at the conclusion of processing and a specimen cover slip 60 may be applied. The main section 28 that includes the adhesive 16, face stock 14, image 18, and over varnish 24 when carried by the slide 12 is capable of being processed in automated staining instruments 64 without the presence of a clear flap on the main section 28 and are still capable of functioning properly as described herein.

After the specimen 42 has been processed by the processing instrument 66 a cover slip 60 may be applied to the slide 12. The slide 12 may be loaded into an automated cover slipper 78 and the cover slip 60 can be attached to the slide 12 so that it covers the specimen 42. The cover slip 60 may not cover any portion of the main section 28. The adhesive 16 on the main section 28 that holds the face stock 14 to the slide 12 will not ooze when the slide 12 is placed into the automated cover slipper 78 to apply the cover slip 60. The slides 12 may be kept in a lab's archive area for storage or archiving.

Due to the fact that the image 18 of the main section 28 is not covered by a film or other material, it is possible for the user to apply writing 40 onto portions of the main section 28. This writing 40 application may be performed in step 122 of the method and can be seen in FIG. 7. The writing 40 may be applied by the user through the use of a pen, pencil, marker, or other specialized lab writing instrument. The writing 40 may be any note or message the user desires to be placed onto the slide 12 for use in conveying information related to the specimen 42 or testing that was conducted on the specimen 42. The writing 40 may physically engage the over varnish 24 of the main section (if an overvarnish is utilized during manufacture) 28 and may in some instances actually engage the super resin ribbon 26 that makes up the image 18.

The label 10 can be used in any industry that requires a label 10 that has the ability to withstand very harsh chemical reagents 44 and strains 48. The image 18 of the main section 28 is uncovered by a clear flap or other member when the image 18 is carried by the slide 12 during application of stainer 48, reagents 44, temperature 46, and testing of the specimen 42. The image 18 may thus not be protected by an over-laminate and may be subjected to but withstand stainers, reagents, antibodies and high temperature during processing. The application of the label 10 may allow for faster application times as it may eliminate certain components and afford easier manipulation by lab technicians whose hands may be gloved during processing.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:
1. Machine printable removable labels, comprising:
   a liner substrate;
   a release agent layer applied to said liner; and
   a plurality of removable segmented face stock labels, each:
   (i) removably affixed to said liner upon said release agent layer by an adhesive layer having minimal fluid flow between the range of temperatures of −40° F. through 300° F.;
   (ii) divided into first and second separable sections by a weakened zone permitting the controlled division of said separable sections and independent removal of one of said sections from said liner substrate along a preselected boundary within said weakened zone, said first and second separable sections combining to engage a printing machine sensor detecting face stock labels of a preselected size;
   (iii) having a thickness of 0.00865 inches to resist fluid flow of a liquid material placed adjacent thereto and subject to an air vortex when said removable label is affixed to a specimen slide substrate; and
   (iv) having an exposed surface which is receptive to at least one of marking inks and dyes and calendered to resist degradation between the temperature range of −40° F. through 300° F.

2. Machine printable removable labels as set forth in claim 1, further comprising an image printed on at least one of said first and second separable sections.

3. Machine printable removable labels as set forth in claim 2, wherein said image further comprises a resin.

4. Machine printable removable labels as set forth in claim 1, wherein said liner is calendered.

5. Machine printable removable labels as set forth in claim 1, wherein said release agent is comprised of silicone.

6. Machine printable removable labels as set forth in claim 1, further comprising an over varnish layer affixed to each of said plurality of removable segmented face stock labels.

7. Machine printable removable labels as set forth in claim 1, wherein said plurality of removable segmented face stock labels further comprise at least one of: synthetic vinyl, polyester, gloss radiant white polyester, polyolefin, polypropylene, polyamide, polyethylene, or combinations thereof.

8. Machine printable removable labels as set forth in claim 1, wherein said plurality of removable segmented face stock labels are resistant to degradation from at least one reagent selected from the group consisting of xylene, acetone, isopropyl alcohol, ethyl alcohol, alkalis, hexane, dimethylformamide, dimethyl sulfoxide, ammonia, 10% neutral buffered formalin (NBF), formic acid, and alcoholic formalin.

9. Machine printable removable labels as set forth in claim 1, wherein said plurality of removable segmented face stock labels are resistant to degradation from at least one staining agent selected from the group consisting of immunohistochemistry (IHC) red, IHC 3,3'-Diaminobenzidine (DAB), messenger ribonucleic acid (mRNA) in situ hybridization (ISH), DNA ISH, fluorescent IHC, and DAB/Red Dual Stains.

10. Machine printable removable labels as set forth in claim 1, wherein said weakened zone further comprises at least one of: (i) a division or (ii) perforations between said first and second separable sections.

11. Machine printable removable labels as set forth in claim 10, wherein said division further comprises a sectioning of the label by a knife.

12. Machine printable removable labels as set forth in claim 1, wherein said thickness of said face stock labels is adjusted utilizing a cutting blade.

13. Machine printable removable labels as set forth in claim 1, wherein said thickness of said segmented face stock labels forms a barrier to fluid flow of a liquid material acted upon by the force of an air vortex when at least a portion of said segmented face stock labels are mounted on a substrate proximate to said liquid material.

14. A method of applying an image to at least one machine printable removable label, said at least one machine printable removable label:
   (i) being mounted on a liner substrate and
   (ii) comprising a plurality of removable segmented face stock labels, each:
      (a) removably affixed to said liner;
      (b) divided into first and second separable sections by a weakened zone permitting the controlled division of said separable sections and independent removal of one of said sections from said liner substrate along a preselected boundary within said weakened zone;

(c) having a thickness of 0.00865 inches to form a fluid flow barrier when subject to an air vortex; and (d) having an exposed surface which is receptive to at least one of marking inks and dyes and calendered to resist degradation between the temperatures of −40° F. through 300° F.;

said method comprising the steps of:

inserting said machine printable removable labels into a printer having a sensor, said sensor detecting each of said first and second separable sections of each of said plurality of removable segmented face stock labels to enable printing functionality; and causing said printer to affix a first image on at least one of said first and second separable sections of at least one of said plurality of removable segmented face stock labels.

15. The method of claim 14, wherein said first image is selected from text or a graphical image.

16. The method of claim 14, further comprising the addition of a second image on at least one of said first and second separable sections of at least one of said plurality of removable segmented face stock labels.

17. The method of claim 16, wherein said second image is applied by at least one of: a printer and manually.

18. The method of claim 16, wherein said second image is applied subsequent to subjecting said removable face stock labels to at least one degradation event selected from the group consisting of: applying temperatures in the range of −40° F. -300° F.; and applying xylene, acetone, isopropyl alcohol, ethyl alcohol, alkalis, hexane, dimethylformamide, dimethyl sulfoxide, ammonia, 10% neutral buffered formalin (NBF), formic acid, alcoholic formalin, immunohistochemistry (IHC) red, IHC 3,3'-Diaminobenzidine (DAB), messenger ribonucleic acid (mRNA) in situ hybridization (ISH), DNA ISH, fluorescent IHC, and DAB/Red Dual Stains.

19. A method of applying a machine printable removable label having a printed image to a specimen slide, said machine printable removable label:

(i) mounted on a liner substrate and (ii) comprising a plurality of removable segmented face stock labels, each:

(a) removably affixed to said liner;

(b) divided into first and second separable sections by a weakened zone permitting the controlled division of said separable sections and independent removal of one of said sections from said liner substrate along a preselected boundary within said weakened zone;

(c) having a thickness of 0.00865 inches;

(d) having an exposed surface which is receptive to at least one of marking inks and dyes and calendered to resist degradation between the range of temperatures between −40° F. -300° F.; and (e) having an image printed on the exposed face thereof;

said method comprising the steps of:

removing at least one of said first and second separable sections of at least one of said plurality of removable segmented face stock labels from said liner substrate;

separating said removed at least one of said first and second separable sections from the other of said first and second separable sections of at least one of said plurality of removable segmented face stock labels along said weakened zone;

applying said at least one of said first and second separable sections of said at least one of said plurality of removable segmented face stock labels to a specimen slide, said removable segmented face stock label forming a barrier to resist fluid flow of a liquid material placed adjacent thereto on said specimen slide when subject to an air vortex.

20. The method of claim 19, wherein said first image further comprises a super resin.

21. The method of claim 19, further comprising the step of exposing said specimen slide having said removable segmented face stock label affixed there to at least one degradation event selected from the group consisting of: applying temperatures in the range of −40° F. -300° F.; and applying xylene, acetone, isopropyl alcohol, ethyl alcohol, alkalis, hexane, dimethylformamide, dimethyl sulfoxide, ammonia, 10% neutral buffered formalin (NBF), formic acid, alcoholic formalin, immunohistochemistry (IHC) red, IHC 3,3'-Diaminobenzidine (DAB), messenger ribonucleic acid (mRNA) in situ hybridization (ISH), DNA ISH, fluorescent IHC, and DAB/Red Dual Stains.

22. The method of claim 19, further comprising the addition of a second image on said removable segmented face stock label affixed to said specimen slide.

23. The method of claim 22, wherein said second image is applied subsequent to subjecting said removable face stock labels to at least one degradation event selected from the group consisting of: applying temperatures in the range of −40° F. -300° F.; and applying xylene, acetone, isopropyl alcohol, ethyl alcohol, alkalis, hexane, dimethylformamide, dimethyl sulfoxide, ammonia, 10% neutral buffered formalin (NBF), formic acid, alcoholic formalin, immunohistochemistry (IHC) red, IHC 3,3'-Diaminobenzidine (DAB), messenger ribonucleic acid (mRNA) in situ hybridization (ISH), DNA ISH, fluorescent IHC, and DAB/Red Dual Stains.

24. The method of claim 19, wherein said thickness of said segmented face stock labels forms a barrier to fluid flow of a liquid material placed adjacent thereto when said at least one of said first and second separable sections of said at least one of said plurality of segmented face stock labels is applied to said specimen slide.

25. The method of claim 24, wherein said thickness of said segmented face stock labels forms a barrier to fluid flow of a liquid material acted upon by the force of an air vortex acting on said liquid material placed on said specimen slide.

* * * * *